US008387939B2

(12) United States Patent
Ford

(10) Patent No.: US 8,387,939 B2
(45) Date of Patent: Mar. 5, 2013

(54) MOUNTING SUPPORT WITH LIGHT

(75) Inventor: Timothy D. F. Ford, Beaconsfield (CA)

(73) Assignee: The Flewelling Ford Family Trust, Beaconsfield (CA)

(*) Notice: Subject to any disclaimer, the term of this patent is extended or adjusted under 35 U.S.C. 154(b) by 288 days.

(21) Appl. No.: 11/738,128

(22) Filed: Apr. 20, 2007

(65) Prior Publication Data

US 2007/0247858 A1 Oct. 25, 2007

Related U.S. Application Data

(60) Provisional application No. 60/745,205, filed on Apr. 20, 2006.

(51) Int. Cl.
*B62J 6/00* (2006.01)
*B62J 9/00* (2006.01)
*B62J 7/00* (2006.01)
*B62J 11/00* (2006.01)
*F21V 33/00* (2006.01)
*F21V 21/00* (2006.01)

(52) U.S. Cl. ........ 248/473; 362/382; 362/474; 224/418; 224/420; 224/445

(58) Field of Classification Search .......... 362/473–476, 362/431; 224/324, 418, 420, 423–425, 445–446, 224/484–487
See application file for complete search history.

(56) References Cited

U.S. PATENT DOCUMENTS

| 575,857 | A | * | 1/1897 | Sly | 248/230.9 |
|---|---|---|---|---|---|
| 4,541,555 | A | * | 9/1985 | Miree | 224/420 |
| 4,569,497 | A | * | 2/1986 | Elmer | 248/230.9 |
| 4,597,473 | A | * | 7/1986 | Peck | 182/187 |
| 4,697,725 | A | * | 10/1987 | Miree | 224/420 |
| 5,011,055 | A | * | 4/1991 | Neugent | 224/449 |
| 5,181,774 | A | * | 1/1993 | Lane | 362/549 |
| 5,477,425 | A | * | 12/1995 | Sun et al. | 362/476 |
| 5,522,122 | A | * | 6/1996 | Turchick et al. | 24/335 |
| 5,732,915 | A | * | 3/1998 | Heard | 248/219.4 |
| 5,921,669 | A | * | 7/1999 | Taylor et al. | 362/476 |
| 7,070,295 | B1 | * | 7/2006 | Lee | 362/191 |
| 7,293,900 | B1 | * | 11/2007 | Lee | 362/476 |
| 2003/0106919 | A1 | * | 6/2003 | Chuang | 224/420 |
| 2003/0137850 | A1 | * | 7/2003 | Liaw et al. | 362/474 |

* cited by examiner

*Primary Examiner* — David J Makiya
(74) *Attorney, Agent, or Firm* — Goudreau Gage Dubuc; Hugh Mansfield

(57) ABSTRACT

A mounting support for mounting an object, such as a light, flashlight or the like, to a mounting surface is disclosed. The support comprises a body to which may be coupled the object, at least two legs projecting from the body, the legs comprising opposed divergently arcuate inner surfaces each providing at least one abutment point for abutting the legs upon the mounting surface, and a fastener for maintaining the abutment. The object or light may be integrally, fixedly, pivotally or otherwise coupled to the body.

17 Claims, 4 Drawing Sheets

US 8,387,939 B2

MOUNTING SUPPORT WITH LIGHT

CROSS REFERENCE TO RELATED APPLICATIONS

This application claims priority on U.S. Provisional Application No. 60/745,205 entitled Mounting Bracket with Light and filed Apr. 20, 2006, the entirety of which is herein incorporated by reference.

FIELD OF THE INVENTION

The present invention relates to mounting supports and, more specifically, to mounting supports for mounting objects, such as a light, to various mounting surfaces of various shapes and sizes.

BACKGROUND OF THE INVENTION

Known mounting supports for use in mounting an object, such as a light, to a given surface are generally confined to specifically adapted supports usable only for specific surface types and shapes. Generally, a given support is adapted for mounting an object to a specific surface having a predefined shape. Selecting the wrong support for a given object, or again manufacturing a given product to include a pre-selected mounting support often results in mounting incompatibilities between the selected support and the surface upon which it is desired to mount the object in question.

SUMMARY OF THE INVENTION

In order to address the above and other drawbacks of known mounting supports, it is an aim of the present invention to provide a novel support compatible with a number of mounting surfaces.

More specifically, in accordance with the present invention, there is provided a mounting support for mounting an object to a mounting surface. The support comprises a body to which may be coupled the object, at least two legs projecting from the body and defining a mounting surface receiving region there between, the legs comprising opposed divergently arcuate inner surfaces each providing at least one abutment point for abutting the legs upon the mounting surface when positioned in the mounting surface receiving region, and a fastener for maintaining the abutment.

There is also disclosed an illuminating device mountable to a mounting surface. The illuminating device comprises a light source pivotally mounted to a body, at least two legs projecting from the body, the legs comprising opposed divergently arcuate inner surfaces each providing at least one abutment point for abutting the legs upon the mounting surface, and a fastener for maintaining the abutment.

Additionally, there is disclosed a mounting support for mounting a tubular flashlight to a mounting surface. The support comprises a body comprising on a first side at least two legs, the legs comprising opposed divergently arcuate inner surfaces each providing at least one abutment point for abutting the legs upon the surface and a fastener for maintaining the abutment, and a flashlight support on a second side of the body, the support comprising a flashlight receiving recess and a means for retaining the flashlight in the recess.

Other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

Reference will now be made to the accompanying drawings, showing by way of illustration, illustrative embodiments of the present invention, and in which.

DESCRIPTION OF THE ILLUSTRATIVE EMBODIMENTS

Figure 1:
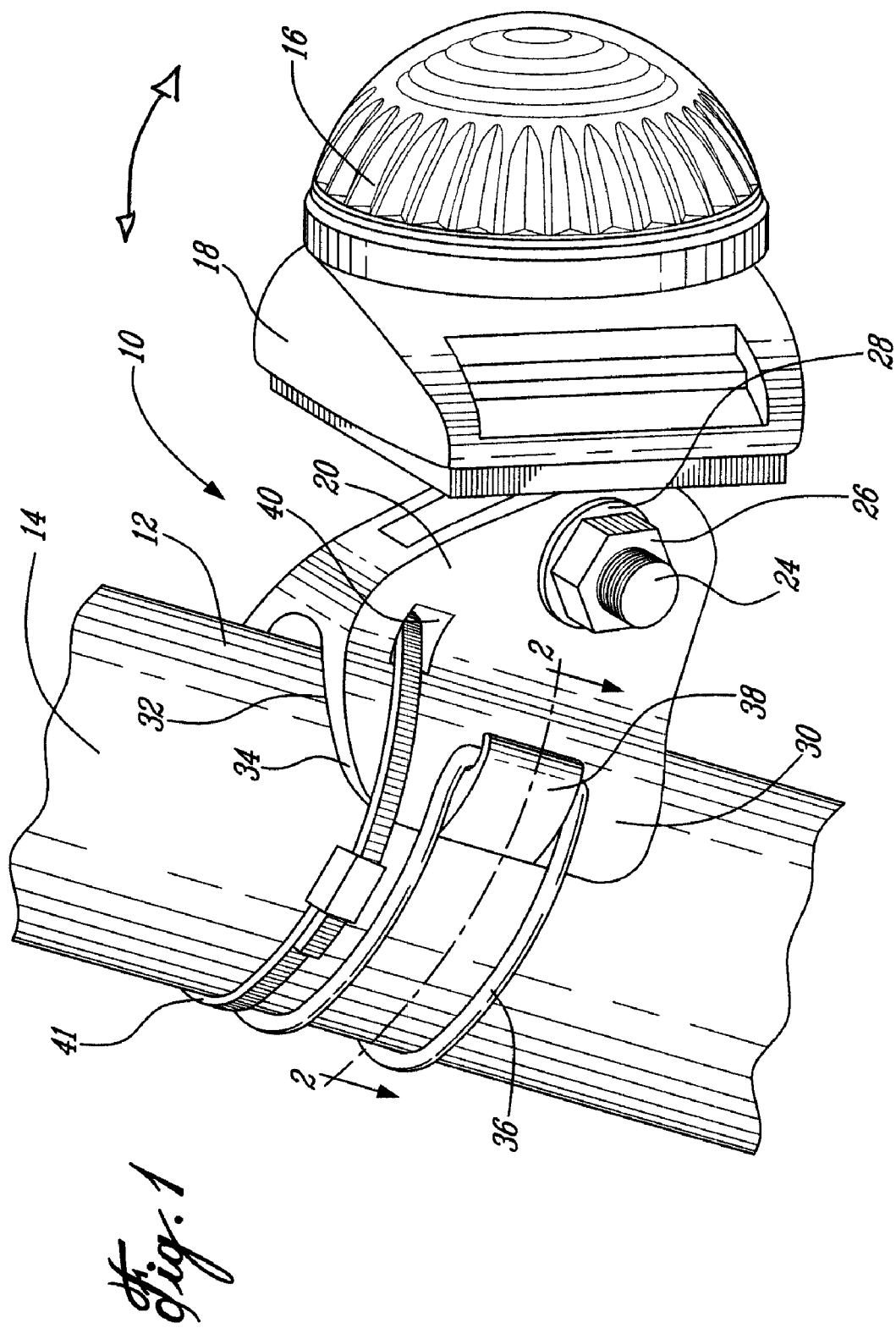
FIG. 1 is a perspective view of a light mounted via a mounting support to a tubular structure, such as a bicycle seat post, in accordance with an illustrative embodiment of the present invention.
Figure 2:
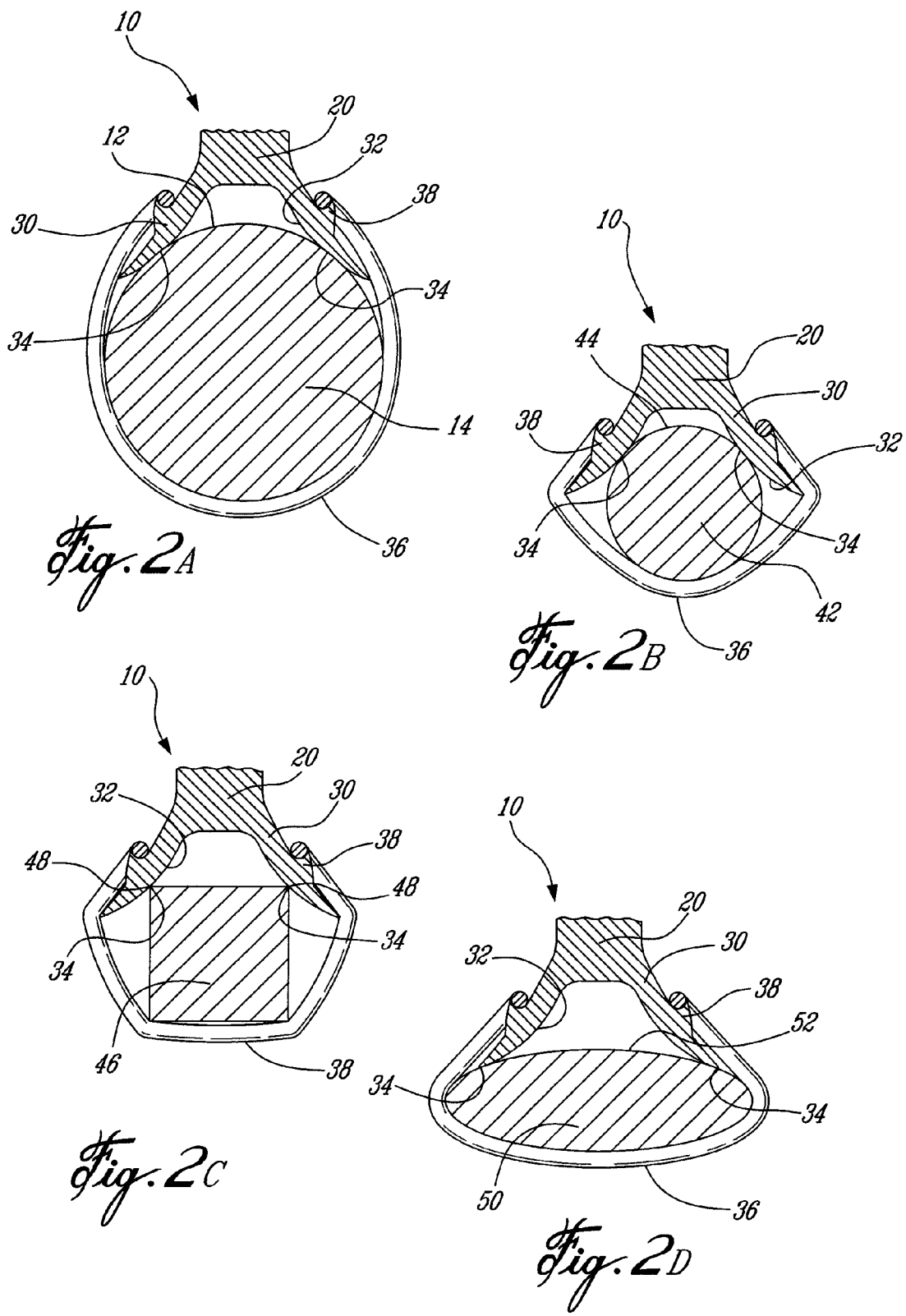
FIG. 2A is a broken cross section of the mounting support and tubular structure of FIG. 1 taken along line 2-2 thereof.
FIGS. 2B to 2D are broken cross sections of the mounting support of FIG. 1 taken along line 2-2 thereof, mounted to alternative structures having various shapes and forms.

Referring now to FIGS. 1 and 2A, a mounting support, generally referred to using the numeral 10, and in accordance with an illustrative embodiment of the present invention, will now be described. The support 10 is generally for use in mounting an object, either integrally, fixedly, adjustably or otherwise coupled thereto, to a mounting surface 12 of a structure 14. In the illustrative embodiment of FIG. 1, the object is a light 16, a base portion 18 of which being pivotally mounted to a body portion 20 of the support 10 via a pivot 22 comprised of a fastener, for example an adjustable fastener such as a securing bolt 24, nut 26 and washer 28 assembly. In particular, the mounting support 10 is illustratively used to mount the light 16 to the seat post, or other such component, of a bicycle (all not shown) or the like. As will be discussed further hereinbelow, the support 10 provides a substantially universal means for mounting various objects to all types of structural shapes and forms.

Still referring to FIGS. 1 and 2A, the mounting support 10 is further illustratively comprised of two (2) legs 30 projecting from the body portion 20. The legs 30 are generally curved and are adapted to engage mounting surfaces and structures, as in 12 and 14, of various shapes and forms. In particular, the curved inner shape of the legs 30 illustratively defines opposed divergently arcuate inner surfaces 32 that each provide at least one abutment point, as in 34, which abut upon the mounting surface 12 when the support 10 is mounted thereon. For instance, in the illustrative embodiment of FIGS. 1 and 2A, the mounting surface 12 comprises a cylindrical surface upon which the abutment points 34 provided by the inner surfaces 32 of legs 30 are abutted.

In addition, the support 10 is further comprised of a fastener 36 for maintaining an abutment of the legs 30 upon the mounting surface 12 when the support 10 is positioned thereon. In the illustrative embodiment of FIGS. 1 and 2A, the fastener 36 is comprised of an elastic band which is hooked onto lateral hook portions 32, disposed on either side of the body portion 20, and wrapped around the mounting surface 12 and structure 14. As such, once the mounting support 10 is positioned on the mounting surface 12, the elastic fastener 36 is used to anchor the support 10 to the surface 12 by applying a pressure thereon which presses and secures the abutment points 34 onto the surface 12. In general, the fastener 36 is used to maintain an abutment of each abutment point 34 upon the mounting surface 12. To dismount the support 10, the fastener 36 is unhooked from hook portions 38 and the support removed from the surface 12.

Still referring to FIGS. 1 and 2A, alternatively, a hole 40 may be provided through the body portion 20 such that an alternative wraparound fastener, such as a cable tie 41 or the like, may be used to either independently or cooperatively secure the mounting support 10 to the surface 12. Such wraparound fasteners may include, but are not limited to, a tie wrap, a string, an elastic band, an adjustable strap, and the like. Also, these and other such wraparound fasteners may be coupled to the body portion 20 through a hole, as in 40, through hook portions, as in 38, or again may be integrally or fixedly coupled directly to the base portion 20. Furthermore, various clamps and clamping devices may be used as fasteners instead of or in addition to the aforementioned wraparound fasteners to secure the mounting support to the mounting surface 12.

Also, the legs 30 of the support 10 may be resiliently coupled to the body portion 20 such that, when the support 10 is mounted to the mounting surface 12, the legs 30 resiliently flex outwardly to provide an enhanced fit and a greater mounting stability.

Referring now to FIGS. 2A to 2D, the support 10 is adapted to be mounted on surfaces and structures of different shapes and forms. For example, as illustrated in FIG. 2B, the support 10 is illustratively mounted to small cylindrical structure 42 having a cylindrical mounting surface 44. As in FIG. 1, the legs 30 of the support 10 are positioned on the surface 44 and the fastener 30 is hooked onto the hook portions 32 and wrapped around the cylindrical structure 42 to secure the support thereon. Due to the divergently arcuate inner surfaces 32 of legs 30, the support 10 may be mounted to the structure 42 just as it was to structure 14 (FIG. 2A). Since the diameter of structure 42 is smaller than the diameter of structure 14, when the support 10 is mounted to structure 42, the abutment points 34 of legs 30 move inwardly toward the body portion 20 to provide an adequate abutment of the legs 30 upon the mounting surface 44.

In FIG. 2C, the support 10 is illustratively mounted to a square tubular structure 46, the edges 48 of which defining the mounting surface upon which are abutted the abutment points 34 of legs 30. The fastener 30 is again hooked onto hook portions 32 and secured around the structure 46.

In FIG. 2D, the support 10 is illustratively mounted to a tubular structure 50 having an oblong cross section and mounting surface 52. Once again, the support 10 is positioned on the surface 52 and the fastener 30 is hooked onto hook portions 32 and secured around the structure 50. In this case, due to the larger dimension of the structure cross section received between legs 30, the abutment points 34 thereof are moved outwardly away from the body portion 20. However, the legs 30 of the support 10 remain adequately positioned and secured against the mounting surface 52.

A person of skill in the art will understand that numerous other examples of mounting surface shapes and forms may be considered in the present context. For instance, the support 10 may be mounted to structures of various shapes and sizes not exclusively limited to tubular structures. For example, the mounting support may be mounted to any structure around which may be wrapped and secured the fastener 30. Alternatively, the mounting support may be used in conjunction with alternative fastening means, such as glues, adhesives, magnets and the like to provide even greater mounting versatility.

Figure 3:
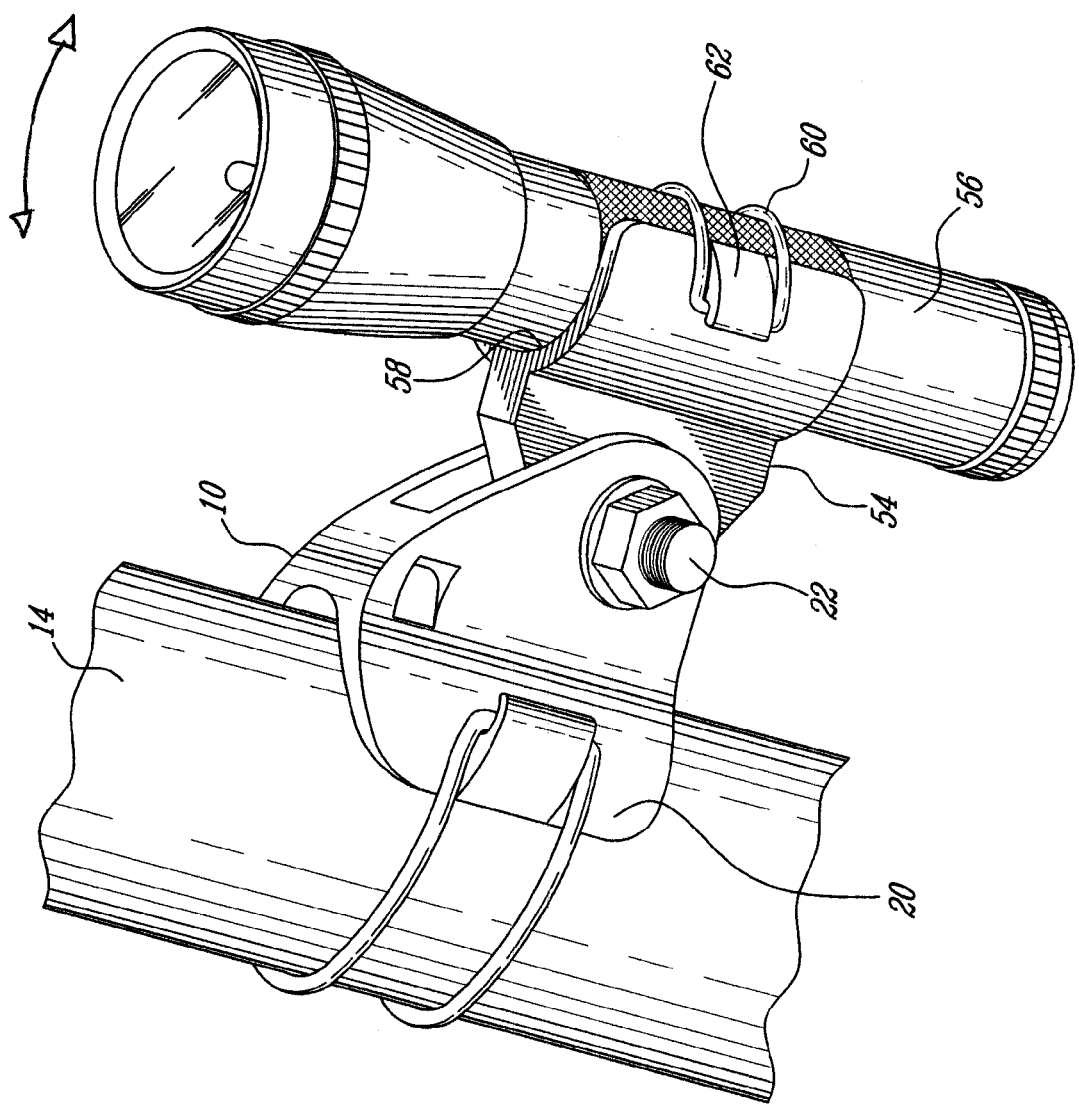
FIG. 3 is a perspective view of a flashlight mounted via a mounting support to a tubular structure in accordance with an alternative illustrative embodiment of the present invention.

Referring now to FIG. 3, in an alternative illustrative embodiment of the support 10, a light supporting portion 54 is pivotally mounted to the body portion 20 via a pivot 22. The light supporting portion 54 is illustratively adapted to receive a conventional tubular flashlight 56, for example by having a concave flashlight receiving recess 58 moulded or otherwise formed therein. In order to retain the flashlight 56 within the recess 58, a fastening system illustratively comprised of a fastener 60 and a pair of hook portions as in 62 is provided. Alternatively, a hole (not shown) could be provided through which an alternative wraparound fastener, such as a cable tie or the like (also not shown), is inserted and either independently or cooperatively securing the flashlight 56 in the flashlight receiving recess 58. Also, the flashlight receiving recess 58 could be moulded or otherwise formed from a flexible material and provided with a gripping surface (not shown) which would provide mechanical interlock with the flashlight 56 when inserted into the recess 58 thereby retaining the flashlight 56 in the recess 58.

Still referring to FIG. 3, the flashlight receiving recess 58 could be also profiled as the body portion 20, that is with a pair of legs having divergently arcuate inner surfaces (not shown) which would allow the recess 58 to receive a diverse range of light emitting devices such as flashlights, light sticks, torches, etc., regardless of their actual cross sectional shapes and dimensions.

Still referring to FIG. 3, although the flashlight receiving recess 58 is illustrated as arranged in parallel with the body portion 20, such that a flashlight 56 mounted in the recess 58 will project light along an axis parallel to that of the structure 14 to which the support 10 is mounted, in an alternative illustrative embodiment the recess 58 could be arranged at an angle, for example at right angles, to the body portion 20.

Figure 4:
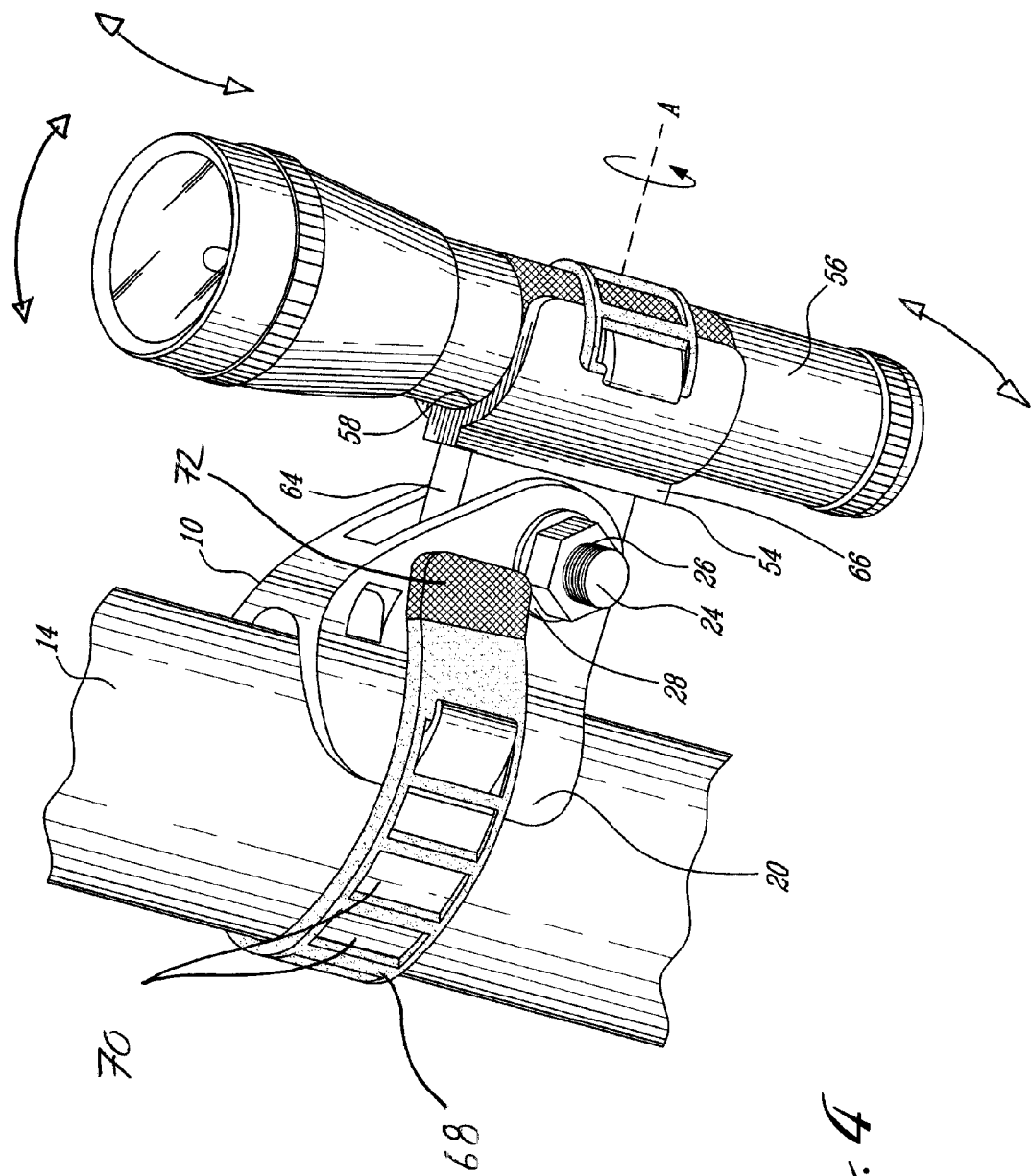
FIG. 4 is a perspective view of a flashlight mounted via a pivoting mounting support to a tubular structure in accordance with a second alternative illustrative embodiment of the present invention.

Referring now to FIG. 4, in a second alternative illustrative embodiment of the present invention, the light supporting portion 54 can be divided into two parts, a lower portion 64 attached to the body portion 20 via the bolt 24, nut 26 and washer 28 assembly and an upper portion 66 in which the flashlight receiving recess 58 is moulded or other wise formed. The upper portion 66 is shown interconnected to the lower portion 64 via a pivot (not shown) having an axis A thereby allowing, for example, a flashlight 56 mounted in the recess 58 to be rotated about axis A into a given position.

Still referring to FIG. 4, the elastic fastener (reference 30 in FIG. 1) can also comprise a flexible strap 68 comprised of a series of apertures 70. Once the support 10 is positioned on the structure 14, the strap 68 is attached to one of the hook portions 38 by inserting the hook portion 38 through an appropriate one of the apertures 70, the strap 68 pulled tight around the structure 14, for example by means of a tab 72 or the like attached towards a second end of the strap, and the strap 68 secured to the support 10 by inserting the other of the hook portions 38 through an appropriate one of the apertures. As illustrated, the same type of strap could also be used to secure the flashlight 56 in the flashlight receiving recess 58.

Although the above illustrative embodiments consider the use of support 10 for mounting a light 16 to a bicycle post, the person of skill in the art will understand that various other objects may be mounted to a number of structures of various shapes and forms. For instance, still in the context of portable light systems, the support 10 may be used to mount a light, as in 16, to a safety helmet. In the particular example of a bicycle helmet, the support may be positioned on one of the vertices defined by the helmet ventilation slots and secured thereto using an appropriate fastener, as in 30.

Also, the person of skill in the art will understand that the exact shape and dimension of the support 10, and particularly of the support's legs 30, may be altered to accommodate different types of mounting surfaces. For instance, the spread and curvature of the legs' inner surfaces 32 may be varied to accommodate bigger or smaller structures. Also, the support 10 may be manufactured of various materials, such as metals, plastics and the like, and part thereof, such as the inner surfaces 32 of the legs 30 may be further covered with various materials or coatings to improve the mounting stability of the support 10 on a given surface. Such materials and coatings may include for example slip-resistant materials (e.g. rubbers, compressible pads, etc.).

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompass any such modifications or embodiments.

What is claimed is:

1. A mounting support for mounting an object to a sporting good such as a bicycle, the sporting good comprising at least one tube of one of a plurality of possible different diameters, the support comprising:
    a body which may be coupled to the object;
    at least two legs projecting from said body and defining a tube receiving region for receiving a selected one of the at least one tube there between, said legs comprising opposed convex inner surfaces, wherein a distance between said opposed convex inner surfaces increases with a distance from said body thereby accommodating the plurality of possible different diameters;
    first and second hooks, one of said hooks on an outer surface of a respective one of said legs, and
    an elastic fastener for stretching between said first and second hooks and maintaining each of said inner surfaces securely in stationary contact with an outer surface of the selected tube along a length thereof.

2. The mounting support of claim 1, wherein the object is a light.

3. The mounting support of claim 1, wherein the selected tube is positioned within said tube receiving region along a tube axis, wherein the object is pivotally mounted to said body such that the object pivots about a pivot axis which is at right angles to the tube axis.

4. The mounting support of claim 1, wherein each of said convex inner surfaces has a width that is greater than its length.

5. The mounting support of claim 1, wherein said legs are resiliently coupled to said body portion and thereby adapted to resiliently engage the outer surface of the selected tube when in said tube surface receiving region.

6. The mounting support of claim 4, wherein said body comprises an aperture therein and further comprising a tie wrap passing through said aperture and around the outer surface of the selected tube when in said tube receiving region.

7. An illuminating device mountable to a sporting good such as a bicycle, the sporting good comprising at least one tube of one of a plurality of different possible diameter, comprising:
    a light source pivotally mounted to a top surface of a body;
    at least two legs projecting from said body and defining a tube receiving region for receiving a selected one of the tubes there between, said legs comprising opposed convex inner surfaces, wherein a distance between said opposed convex inner surfaces increases with a distance from said body thereby accommodating the plurality of possible different diameters;
    first and second hooks, one of said hooks on an outer surface of a respective one of said legs; and
    an elastic fastener for stretching between said first and second hooks and maintaining each of said inner surfaces securely in stationary contact with an outer surface of the selected tube along a length thereof.

8. The illuminating device of claim 7, wherein each of said convex inner surfaces has a width which is greater than its length.

9. The mounting support of claim 8, wherein said body comprises an aperture therein and further comprising a tie wrap passing through said aperture and around the outer surface of the selected tube.

10. The mounting support of claim 7, wherein the selected tube is positioned within said tube receiving region along a tube axis and wherein said light source pivots about a pivot axis which is at right angles to the tube axis.

11. The mounting support of claim 10, wherein said light source emits light generally along a light emitting axis and further wherein said light source may be pivoted between a first position wherein said light is emitted in parallel to said tube axis and a second position wherein said light is emitted at right angles to said tube axis.

12. The mounting support of claim 11, wherein said light source may be pivoted to a third positioned wherein said light is emitted at an angle to said tube axis and in a direction opposite to that of said first position.

13. A mounting support for mounting a tubular flashlight to a sporting good such as a bicycle, the sporting good comprising at least one tube of one of a plurality of different possible diameters, the support comprising:
    a body comprising on a first surface at least two legs, said legs defining a tube receiving region for receiving a selected one of the tubes there between and comprising opposed convex inner surfaces, wherein a distance between said opposed convex inner surfaces increases with a distance from said body thereby accommodating the plurality of possible different diameters
    first and second hooks, one of said hooks on an outer surface of a respective one of said at least two legs; and
    an elastic fastener for stretching between said first and second hooks and maintaining each of said inner surfaces securely in stationary contact with an outer surface of the selected tube along a length thereof; and
    a flashlight support on a second surface of said body, said support comprising a flashlight receiving recess and a means for retaining the flashlight in said recess.

14. The mounting support of claim 13, wherein the selected tube is positioned within said tube receiving region along a tube axis, wherein said flashlight support is pivotally mounted on a first side to said body such that the flashlight pivots about a pivot axis which is at right angles to the tube axis and wherein said flashlight receiving recess is on a second side of said flashlight support.

15. The mounting support of claim 13, wherein said flashlight support comprises an arcuate inner surfaces, said inner surfaces defining said flashlight receiving recess.

16. The mounting support of claim 13, wherein said flashlight support is manufactured from a resilient, flexible material, wherein said flashlight receiving recess is designed to grip the flashlight when inserted into said recess and further wherein said fastening means comprises a mechanical interlock between the flashlight and said recess.

17. The mounting support of claim 13, wherein said flashlight support comprises an aperture therein and further comprising a tie wrap passing through said aperture and around the flashlight.

* * * * *